(12) United States Patent
Menard et al.

(10) Patent No.: US 9,505,098 B2
(45) Date of Patent: Nov. 29, 2016

(54) ORIENTATION DEVICE FOR ORIENTATING A SENSOR PROBE

(71) Applicant: GAZTRANSPORT ET TECHNIGAZ, Saint Remy les Chevreuse (FR)

(72) Inventors: Georges Menard, Saint Nazaire (FR); Pierre Lecourtois, Chevreuse (FR); Nicolas Laurain, Briis sous Forges (FR); Bruno Deletre, Versailles (FR)

(73) Assignee: Gaztransport Et Technigaz (FR)

( * ) Notice: Subject to any disclaimer, the term of this patent is extended or adjusted under 35 U.S.C. 154(b) by 168 days.

(21) Appl. No.: 14/382,451

(22) PCT Filed: Feb. 28, 2013

(86) PCT No.: PCT/FR2013/050426
§ 371 (c)(1),
(2) Date: Sep. 2, 2014

(87) PCT Pub. No.: WO2013/128135
PCT Pub. Date: Sep. 6, 2013

(65) Prior Publication Data
US 2015/0107381 A1 Apr. 23, 2015

(30) Foreign Application Priority Data
Mar. 2, 2012 (FR) ..................................... 12 51955

(51) Int. Cl.
- *B23Q 17/20* (2006.01)
- *B23Q 17/22* (2006.01)
- *B23Q 35/08* (2006.01)
- *G01D 11/30* (2006.01)
- *B23Q 35/26* (2006.01)

(52) U.S. Cl.
CPC ............... *B23Q 17/20* (2013.01); *B23Q 35/26* (2013.01); *G01D 11/30* (2013.01)

(58) Field of Classification Search
CPC ...... B23Q 17/22; B23Q 17/20; B23Q 17/00; B23Q 35/04; B23Q 35/08; B23Q 35/26; G01D 11/30
See application file for complete search history.

(56) References Cited

U.S. PATENT DOCUMENTS

| | | | | |
|---|---|---|---|---|
| 2,866,631 A | * | 12/1958 | Cink | B23K 7/007 266/54 |
| 3,439,372 A | * | 4/1969 | Collier | B66F 11/046 15/50.1 |
| 3,572,206 A | * | 3/1971 | Eckstein et al. | B23C 1/12 409/119 |

FOREIGN PATENT DOCUMENTS

| | | |
|---|---|---|
| DE | 2514415 | 10/1976 |
| FR | 2701415 | 8/1994 |

* cited by examiner

*Primary Examiner* — Nguyen Ha
(74) *Attorney, Agent, or Firm* — Berenato & White, LLC (57) ABSTRACT

A device for orientating a sensor probe relative to the local normal vector of a work surface, the device comprising: a frame, a moving support element linked to the frame and able to slide in a predetermined direction, a sensor probe able to pivot on an axis of rotation not parallel to the predetermined direction relative to a point of articulation of the support element, pressure means able to move and generate a force on the moving support element in predetermined direction so as to press the sensor probe against the work surface, in which the sensor probe comprising a single convex external sensing surface suitable for being placed in contact with the work surface, the sensing surface having a single equilibrium contact point, the equilibrium contact point being the point on the sensing surface closest to the point of articulation.

20 Claims, 6 Drawing Sheets

ORIENTATION DEVICE FOR ORIENTATING A SENSOR PROBE

CROSS-REFERENCE TO RELATED APPLICATIONS AND CLAIM TO PRIORITY

This application is a national stage application of International Application No. PCT/FR2013/050426 filed Feb. 28, 2013, which claims priority to French Patent Application No. 1251955 filed Mar. 2, 2012, of which the disclosures are incorporated herein by reference and to which priority is claimed.

FIELD OF THE INVENTION

The invention relates to the field of tools for mechanically measuring the normal of a surface. For example, the present invention relates to tools for following the normal of a surface to guide work tools relative to the surface.

BACKGROUND OF THE INVENTION

Tools for following the normal of a surface can be used to guide a welding torch for the welding of metal plates, for example, to produce a sealed tank wall.

Such a sealed tank is obtained by welding together metal parts which have a common profile. FR2701415 describes an automatic machine which is capable of producing welds following the profile common to the metal parts to produce such a tank wall.

Such a machine comprises a support that is fixed relative to the parts to be assembled. A carriage is mounted on this fixed support and moves along an advance trajectory. This carriage bears a welding torch which can produce spot welds or weld beads. This torch can move in rotation and in translation relative to the robot. The rotational and translational mobility of the torch is controlled by a control device. This control device is in turn connected to detection means on the carriage which measure the position of the torch relative to the surface. The control device transmits control signals to actuators according to the position transmitted by the detection means. Based on these control signals, these actuators orientate and position the torch relative to the metal parts.

The abovementioned detection means can be, for example, a laser range finder, an inductive detector or a capacitive detector. However, this type of automatic machine requires computation means to determine the tangent to the profile and thus orient the welding torch according to this tangent. Furthermore, these types of detection means are costly and can even be sensitive to electromagnetic disturbances.

DE-U-2514415 describes a reproduction probe for a milling machine which comprises a fixing rod, a probe mounted to pivot thereon and an abutment on the free end of the probe.

SUMMARY OF THE INVENTION

According to one embodiment, the invention provides an orientation device for orientating a sensor probe relative to the local normal vector of a work surface, the device comprising:
a frame,
a moving support element linked to the frame and able to slide in a predetermined direction relative to the frame,
a sensor probe able to pivot on an axis of rotation not parallel to the predetermined direction relative to a point of articulation of the support element,
pressure means able to move and generate a force on the moving support element in said predetermined direction so as to press the sensor probe against the work surface,
in which the sensor probe comprises a single convex external sensing surface able to be placed in contact with the work surface, the sensing surface having a single equilibrium contact point, the equilibrium contact point being the point on the sensing surface closest to the point of articulation.

According to embodiments, such an orientation device can comprise one or more of the following features.

According to one embodiment, the sensor probe is only able to pivot on the axis of rotation.

According to one embodiment, the sensing surface has a form of revolution about an axis of revolution parallel to the axis of rotation, the axis of revolution being spaced apart from the axis of rotation.

According to one embodiment, the sensor probe comprises:
a handle comprising a first part pivotably linked to the point of articulation of the support element and defining the axis of rotation and a second part parallel to the first part and offset from the first part to define the axis of revolution, and
a roller having the sensing surface, the roller being able to pivot relative to the second part of the handle to roll on the work surface.

According to one embodiment, the sensor probe is able to pivot on a second axis of rotation not parallel to the predetermined direction relative to the point of articulation of the support element, the second axis of rotation being at right angles to the first axis of rotation.

According to one embodiment, the articulation between the sensor probe and the support element is a ball joint.

According to one embodiment, the sensing surface is substantially in the form of a spherical cap having a center spaced apart from the point of articulation.

According to one embodiment, the device also comprises a first angle measurement element and a second angle measurement element each able to measure an angular displacement about first and second respective axes of rotation of the sensor probe relative to a respective reference position,
and the sensor probe comprises a measurement surface in the form of a second spherical cap centered on the point of articulation,
the two angle measurement elements each comprising a measurement rod having a cylindrical surface of revolution in contact with the measurement surface, each measurement rod being able to pivot on one of the axes of rotation upon the rotation of the sensor probe.

According to one embodiment, the predetermined direction of sliding of the moving support element is substantially at right angles to the work surface.

According to one embodiment, the device also comprises a guiding rail intended to be arranged along the work surface, the frame being mounted so as to move on the guiding rail.

According to one embodiment, the device also comprises a follower member linked to the sensor probe, the frame comprising pressing means suitable for pressing the follower member onto a setback surface separating two parts of the work surface, the follower member being securely attached to the sensor probe so as to pivot upon the pivoting of the sensor probe and so as to keep the sensor probe at a predetermined distance from the setback surface.

According to one embodiment, the device comprises means for moving the sensor probe in the sliding direction, a direction of advance and a pressing direction, the direction of advance and pressing direction each being at right angles to the sliding direction, the pressing means being able to press the follower member in the pressing direction and the direction of advance being at right angles to the pressing direction.

According to one embodiment, the frame also comprises a position sensor suitable for measuring the distance between the frame and the work surface.

According to one embodiment, the device also comprises an angle measurement element suitable for measuring an angular displacement about the axis of rotation of the sensor probe relative to a reference position.

According to one embodiment, the angle measurement element is chosen from electrical potentiometers, optical range finders, mechanical range finders, incremental coders, inductive sensors, comparators and optical triangulation sensors.

According to one embodiment, the angle measurement element comprises a shaft driven in rotation by the rotation of the sensor probe about the axis of rotation via a coupling chosen from the group comprising flexible couplings, direct couplings, gear train couplings, notched belt couplings and rocker arm system couplings.

According to one embodiment, the angle measurement element comprises a range finder arranged in such a way as to detect the position of a top surface of the roller opposite the sensing surface in the reference frame of the moving support element.

According to one embodiment, the angle measurement element comprises a cam linked to the sensor probe to pivot securely together with the sensor probe on the axis of rotation and a range finder arranged in such a way as to detect the position of a surface of the cam in the reference frame of the moving support element.

According to one embodiment, the device also comprises a tool for treating the work surface capable of pivoting about the axis of rotation according to the pivoting of the sensor probe.

According to one embodiment, the sensor probe is only able to pivot on the axis of rotation, the sensing surface having a form of revolution about an axis of revolution parallel to the axis of rotation, the axis of revolution being spaced apart from the axis of rotation, the sensor probe comprising a handle comprising a first part pivotably linked to the point of articulation of the support element and defining the axis of rotation and a second part parallel to the first part and offset from the first part to define the axis of revolution, and in which the first part of the handle comprises a support and the treatment tool is linked securely to the support to pivot with the handle.

According to one embodiment, the device also comprises a distance sensor suitable for measuring a distance relative to the work surface, the sensor being arranged at a point of the device situated upstream of the point of contact between the work surface and the external sensing surface, in a direction of advance.

One idea on which the invention is based is to determine the normal of a surface measured directly at a point of the surface measured by pressing an articulated convex sensing surface onto the measured surface, the convex surface being articulated at a point off-center from the center of curvature of the convex surface.

Some aspects of the invention start from the idea of making the measurement of the normal of the surface along a trajectory continuously by producing a cylindrical sensing surface capable of rolling about the axis of the cylinder to move along the measured surface and capable of pivoting on an axis that is off-center relative to the axis of the cylinder to determine the normal of the measured surface.

Some aspects of the invention start from the idea of determining the normal of a surface in three directions by allowing the rotation according to three degrees of freedom of the sensing surface.

Some aspects of the invention start from the idea of orientating a tool according to the normal of the measured surface, the normal being measured at a point neighboring the area of effect of the tool.

Some aspects of the invention start from the idea of exerting a pressing force on the measured surface in the direction of the normal of the measured surface at the point of contact with the convex surface by exerting a force on the convex surface.

Some aspects of the invention start from the idea of producing a device for measuring the normal of a surface that makes it possible to measure the normal of a measured surface simply, economically, robustly and in real time.

The invention will be better understood, and other aims, details, features and advantages thereof will become more clearly apparent from the following description of a number of particular embodiments of the invention, given purely as illustrative and nonlimiting examples, with reference to the attached drawings.

DETAILED DESCRIPTION OF THE PREFERRED EMBODIMENTS

Figures 1, 2:
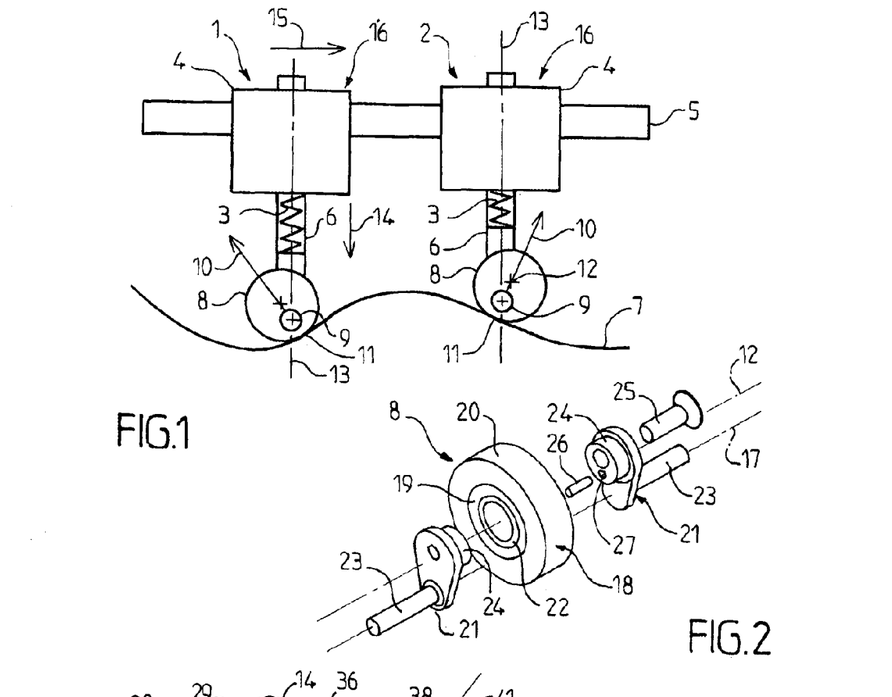
FIG. 1 is a schematic view for two positions of a sensor carriage moving on a guiding rail.
FIG. 2 is an exploded perspective view of a flat roller that can be implemented on the sensor carriage of FIG. 1.

FIG. 1 shows a sensor carriage 16 moving on a guiding rail 5 over a measured surface 7. The sensor carriage 16 is represented in FIG. 1 in two positions 1 and 2 corresponding to two successive positions reached by the sensor carriage 16 in its movement on the guiding rail 5 in a direction of advance 15 defined by the orientation of the guiding rail 5.

The sensor carriage 16 comprises a frame 4 in which actuators can set a pinion in motion. The pinion is engaged with a rack securely attached to the rail 5. This rack extends in the direction of the rail 5. Thus, when the actuators drive the pinion in rotation, the latter cooperates with the rack to provoke the movement of the sensor carriage 16 in the direction of advance 15. The driving can also be produced by notched belt, cable, pressed rolling, cylinder or linear motor.

A bearing arm 6 is mounted to slide relative to the frame 4 of the sensor carriage 16 along a sliding axis 13 at right angles to the direction of advance 15. A spring 3 compressed between the frame 4 and a bearing arm 6 presses a roller 8 linked to the end of the bearing arm 6 onto the measured surface 7. The pressing of the roller 8 onto the surface 7 is thus done in a bearing direction 14 parallel to the sliding direction 13.

The roller 8 has a circular external surface whose center corresponds to a rolling axis 12 and is linked to the bearing arm 6 via a pivot 9. The pivot 9 therefore allows the rotation of the center of the roller 8 relative to the bearing arm 6 about a pivoting axis 17. The pivoting axis 17 of the pivot 9 is off-center relative to the center of the circular surface of the roller 8. When the bearing arm 6 exerts a pressure under the stress of the spring 3 on the roller 8, the center of the roller 8 pivots, because of the reaction force exerted by the measured surface 7 at a point of contact 11 of its circular external surface, about the pivoting axis 17. This pivoting is provoked until the point of contact 11 corresponds to an equilibrium point. The center of the roller 8 then adopts an orientation 10 relative to the axis 17 which corresponds to the local normal of the measured surface 7 at the point of contact 11 between the roller 8 and the measured surface 7. The orientation 10 relative to the pivoting axis 17 of the roller 8 corresponds to the half-line formed by the pivoting axis 17 and the center of the roller 8 in a plane at right angles angle to the pivoting axis 17 and the measuring surface 7.

More specifically, when the arm 6 presses the roller 8 against the measured surface 7 and when the point of contact 11 is not in the equilibrium position, the stress exerted at the pivot 9 and the reaction exerted by the measured surface at the point of contact 11 of the roller 8 on its surface generate a moment which provokes the rotation of the roller about the pivot 9.

Thus, in the initial position 1, the roller 8 is orientated along the normal to the measured surface 7. Since the surface 7 has an upward slope relative to the direction of advance 15, the orientation 10 of the roller 8 in the initial position 1 includes a component opposite to the direction of advance 15. When the sensor carriage 16 advances to a final position 2, the roller 8 remains pressed against the measured surface 7 by the spring 3. The roller 8 rolls or slides against the measured surface 7 to the final position 2 and the orientation of the roller 10 varies progressively to reach the orientation 10 of the roller 8 represented in the final position 2. The final orientation 10 has a component orientated in the direction of advance 15 because the slope of the measured surface 7 is downward relative to the direction of advance 15. Between the first position 1 and the second position 2, the elevation of the level of the measured surface 7 relative to the frame 4 provokes the sliding of the bearing arm 6 upward and therefore the compression of the spring 3. The lowering of the level of the measured surface 7 then provokes the sliding of the bearing arm 6 downward and therefore the relaxing of the spring 3 to the second position 2.

During the movement of the sensor carriage 16, an electronic circuit, not represented, can measure the pivoting of the roller 8 about the pivot 9 and transmit control signals to a tool, not represented, to orient this tool relative to the measured surface 7. The tool can, for example, be a welding tool. Moreover, the frame 4 can include a position sensor to measure the distance between the fame 4 and the measured surface 7, the control signals being also generated as a function of this position measurement.

Figure 11:
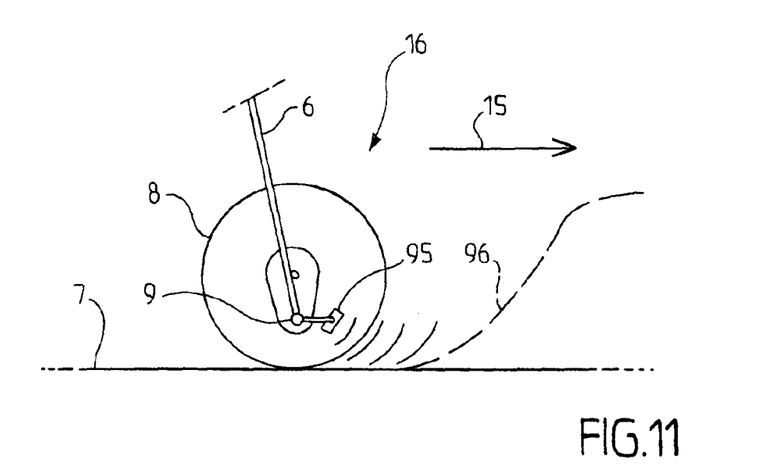
FIG. 11 represents another embodiment of the sensor carriage.

In the embodiment of FIG. 11, the carriage 16 transports a transducer 95 which measures the distance between the measured surface 7 and the transducer 95. The transducer 95 is placed ahead of the welding area of the welding tool in a position a few millimeters away, in front of the pivoting axis 9 of the roller 8. In this way, the transducer 95 can detect a variation of the slope ahead of the welding in the direction of advance 15. The prior detection of the slope variation enables the carriage to define areas of a change of working speed of the tool. In practice, during the movement of the carriage 16, a reduction in the measured distance means that the carriage 16, and therefore the associated tool, arrive at an upward slope 96. The carriage 16, and therefore its welding speed, slows down. When the carriage 16 is present on the upward slope 96, any increase in the measured distance means that the tool has arrived at the summit of the slope and the welding speed is modified accordingly.

In the case where the measured surface consists of two superposed plates forming a wave, similar operation can be observed. By symmetry, when the carriage 16 has reached the summit of the wave, the transducer 95 detects an increase in the distance. When the tool reaches the foot of the wave, the transducer 95 detects a reduction in the distance.

This measurement of the distance also enables the electronic circuit to anticipate the slope variations and to communicate control signals accordingly to the welding tool to anticipate a change of orientation of the welding tool. Thus, the transducer 95 makes it possible to facilitate the changes of working speed and of positioning of the welding tool, for example by slowing down the progress before each significant change of slope.

Figure 3:
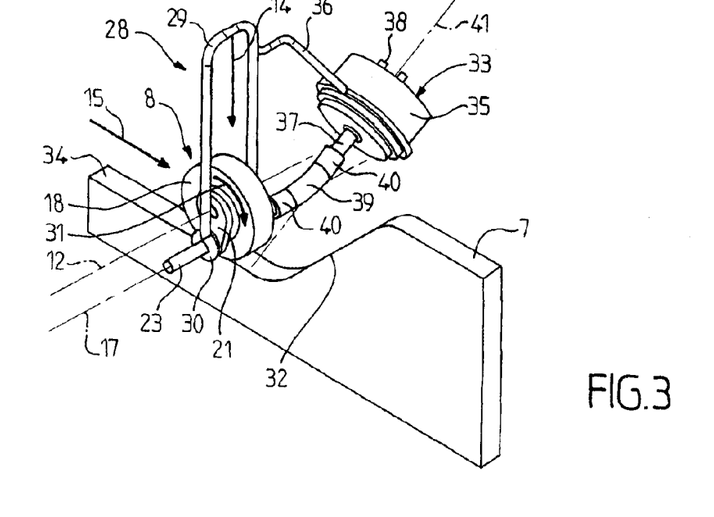
FIG. 3 is a partial perspective view of the sensor of the sensor carriage of FIG. 1 comprising the roller of FIG. 2.

FIGS. 2 and 3 respectively show, in more detail, the roller 8 and a sensor 28 that can be put in place on the sensor carriage 16 and including the roller 8.

FIG. 2 is an exploded view of the roller 8. The roller 8 comprises a wheel 18 having a planar tread 20 and in which a ball bearing 19 is mounted coaxially relative to the tread 20. Two handles 21 are each mounted on one side of the internal ring 22 of the ball bearing 19. These two handles 21 allow for the rotation of the assembly formed by the wheel 18 and the handles 21 about the pivoting axis 17. For its part, the ball bearing 19 allows the rotation of the wheel 18 relative to the handles 21 about a rolling axis 12 off-center relative to the pivoting axis 17. In this way, to return to FIG. 1, the wheel can roll on the measured surface 7 independently of the pivoting of the roller 8 during the movement of the sensor carriage 16.

To this end, each of the handles 21 comprises a pivot shaft 23 and a crank pin 24 that is maintained off-center relative to the pivot shaft 23. The crank pins 24 are centered on and extend along the rolling axis 12, and the pivot shafts 23 are coaxial relative to the pivoting axis 17.

The crank pins 24 are tight-fitted in the bore of the internal ring 22 of the ball bearing 19. The two handles 21 are rigidly linked to one another by a joining screw 25 which clamps the two handles 21 each on one side of the internal ring 22 of the ball bearing 19 and an indexing pin 26 in a straddling position in the respective drill holes 27 of the two handles 21. These drill holes 27 are orientated in a direction parallel to the rolling axis 12 to link the rotational mobility of two handles 21 together. The tight fitting of the handles in the bore of the ball bearing 19 makes it possible to reduce the stresses on the joining screw 25.

Referring to FIG. 3, a sensor 28 comprising the roller 8 will now be described. The sensor 28 comprises a U-shaped support 29 positioned on a plane at right angles to the direction of advance of the carriage 16.

The U-shaped support 29 comprises, on each end of the branches of the U, a bearing 30 which supports a pivot shaft 23 of one of the two handles 21 in a transverse direction relative to the direction of advance 15 and the measured surface 7. In this way, the roller 8 can pivot about the pivoting axis 17 between the branches of the U by virtue of the handles 21.

The support 29 is fixed to a bearing arm 6, which is not represented. The bearing arm 6 exerts a force on the support 29 under the stress of the spring 3, not represented, in the bearing direction 14. Thus, the roller is pressed against the measured surface 7. Moreover, the carriage 16 drives the support 29 via the bearing arm 6 in the direction of advance 15.

FIG. 3 illustrates the roller 8 pressed onto a planar section 34 of the measured surface 7. Thus, the latter is orientatated in a direction parallel to the branches of the U of the support 29, and therefore parallel to the bearing direction 14. In this position, the point of contact is situated below the pivoting axis 17.

When the roller moves along the measured surface 7, the wheel rolls on the measured surface 7 by the rotation 31 about the rolling axis 12.

The measured surface 7 comprises an upward slope 32. When the roller 8 reaches the upward slope 32, the handles 21 are automatically orientated to the normal of this slope. More specifically, under the effect of the reaction of the measured surface 7 on the roller 8, the handles 21 are orientated by pivoting about the pivoting axis 17 in the bearings 30. This pivoting is performed in such a way that the distance between the pivoting axis 17 and the point of contact 11 between the measured surface 7 and the tread 20 is the minimum to reach the equilibrium position.

A potentiometer 33 is fixed to the end of one of the pivot shafts 23 to allow for the measurement of the pivoting of the handles 21.

More specifically, the potentiometer 33 comprises a housing 35 fixed to the support 29 by a fixing arm 36. The potentiometer also comprises a measurement shaft 37 suitable for rotating relative to the housing 35 about an axis of rotation 41 which is not parallel to the pivoting direction 17. A flexible coupling consisting of a flexible part 39 securely attached to two rigid bushes 40 is fixed between the ends of the measurement shaft 37 and one of the pivot shafts 23. In this way, the rotation of the pivot shaft 23 is transmitted to the measurement shaft 37.

An electronic circuit, not represented, is connected to terminals 38 of the potentiometer 33 and measures the variation of the characteristic of the potentiometer 33 at the terminals 38 due to the rotation of the measurement shaft 37 relative to its housing 35.

In other embodiments, the potentiometer and the pivot shaft can be coaxial. Thus, the potentiometer 33 can be coupled directly and rigidly with the pivot shaft. Other coupling alternatives between the potentiometer 33 and the pivot shaft 23 are illustrated in FIGS. 4 to 6.

Figure 4:
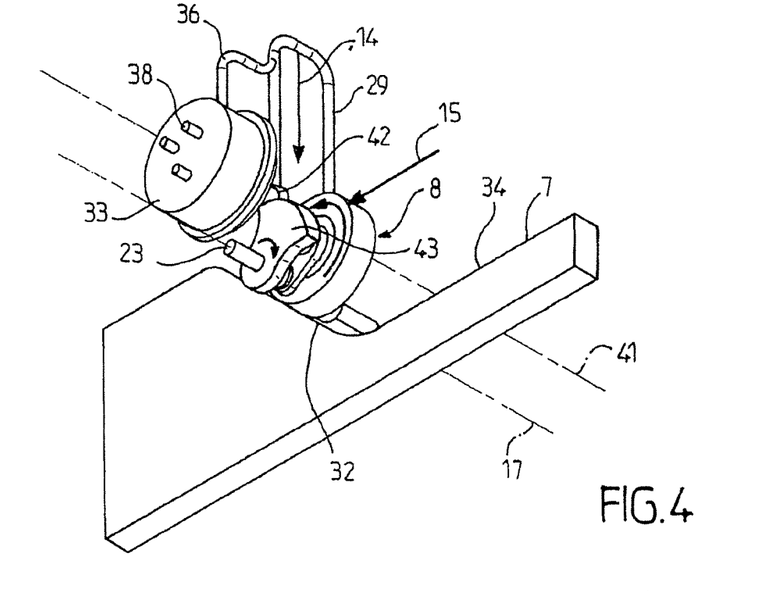
FIGS. 4 to 6 are partial perspective views of three variants of the sensor that can be implemented on the sensor carriage of FIG. 1.

FIG. 4 shows that the axis of rotation 41 of the measurement shaft 37 is parallel to the pivoting axis 17 of the handle 21. A notched segment 43, fixed to the pivot shaft 23, transmits the rotation of the handles 21 to a pinion 42 fixed to the measurement shaft 37 of the potentiometer 33. The measurement shaft 37 is held to rotate in the support 29 by a bearing. The notched segment 43 has a primitive diameter greater than the pinion 42 which makes it possible to gear down the rotation of the handle 21 at the pinion 42. In this way, the potentiometer 33 and the associated electronic circuit can more accurately measure the orientation of the roller 8.

Figure 5:
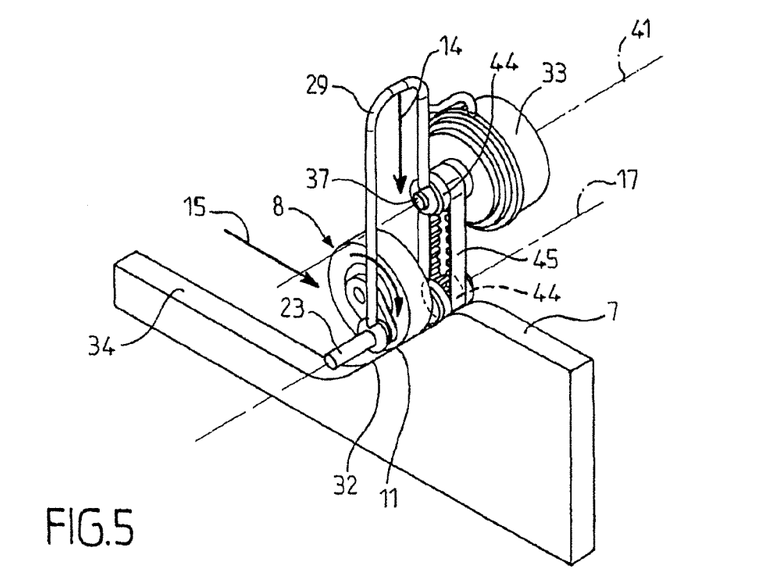
Figure 6:
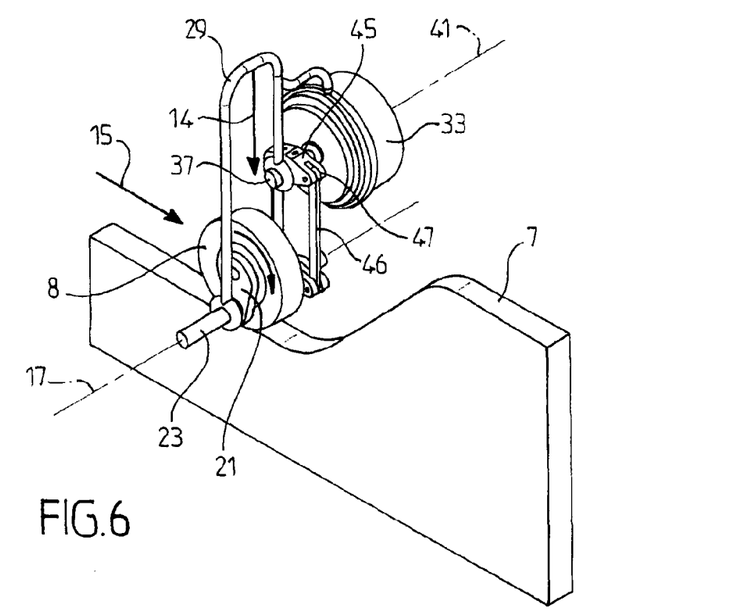

FIG. 5 shows another alternative coupling between the pivot shaft 23 and the measurement shaft 37. In a manner similar to the embodiment described with reference to FIG. 4, the axis of rotation 41 and the pivoting axis 17 are parallel and the measurement shaft 37 is supported by a bearing. In this figure, the pivot shaft 23 and the measurement shaft 37 each comprise a pinion 44 of the same primitive diameter situated in one and the same plane at right angles to the pivoting axis. A notched belt 45 allows for the transmission of the rotation of the pinion 44 of the pivot shaft 23 to the pinion 44 of the measurement shaft 37.

FIGS. 4 and 5 illustrate the position of the roller 8 when the roller 8 is on the upward slope 32 of the measured surface 7. By contrast to FIG. 3, the handles 21 are no longer orientated in the direction of the branches of the support 29. In practice, the roller 8 automatically adopts an orientation 10 normal to the measured surface 7 at the point of contact of the roller 8 on the measured surface 7 under the pressing stress of the arm 6. The upward slope 32 has a slope of 45° relative to the planar section 34 of the measured surface. Thus, the handles 21 automatically adopt an orientation 10 having an angle of 45° relative to the support 29 and relative to the planar section 34. Moreover, the point of contact 11 is situated forward of the support 29 in the direction of advance 15.

FIG. 6 illustrates a device similar to FIGS. 3 to 5 in which the coupling is made using a rocker arm system. For this, two rocker arms 47 are respectively fixed to the pivot shaft 23 of the handle 21 and to the measurement shaft 37. The rocker arms 47 consist of a body comprising a bore which is passed through either by the measurement shaft 37 or by the pivot shaft 23. Two wings extend respectively on two opposite sides of the body in a direction at right angles to the bore. These two wings each comprise a slot 45 which extends in the wing on a plane at right angles to the direction of the bore. Each slot accommodates a link rod 46 pivotably fixed to the wings of the rocker arm. Thus, the rocker arm system comprises two link rods 46 whose ends are each fixed to a wing of each of the rocker arms 47.

Thus, in its pivoting, the pivot shaft 23 drives the rotation of the associated rocker arm 47 about the pivoting direction. This rotation is transmitted to the rocker arm 47 associated with the measurement shaft 37 via the link rods 46.

The coupling modes presented with reference to FIGS. 4 to 6 notably make it possible to reduce the bulk of the potentiometer 33 on the measured surface 7.

Figure 12:
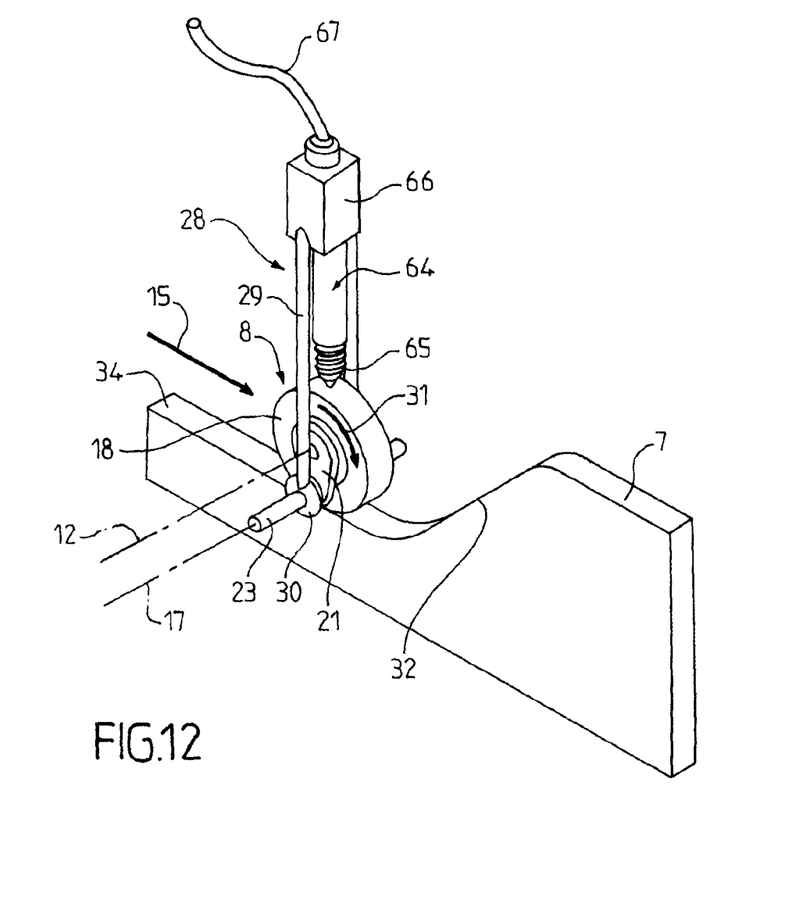
FIGS. 12 to 14 are views similar to FIG. 3 showing other embodiments of the sensor provided with a conversion device.
Figures 13, 14:
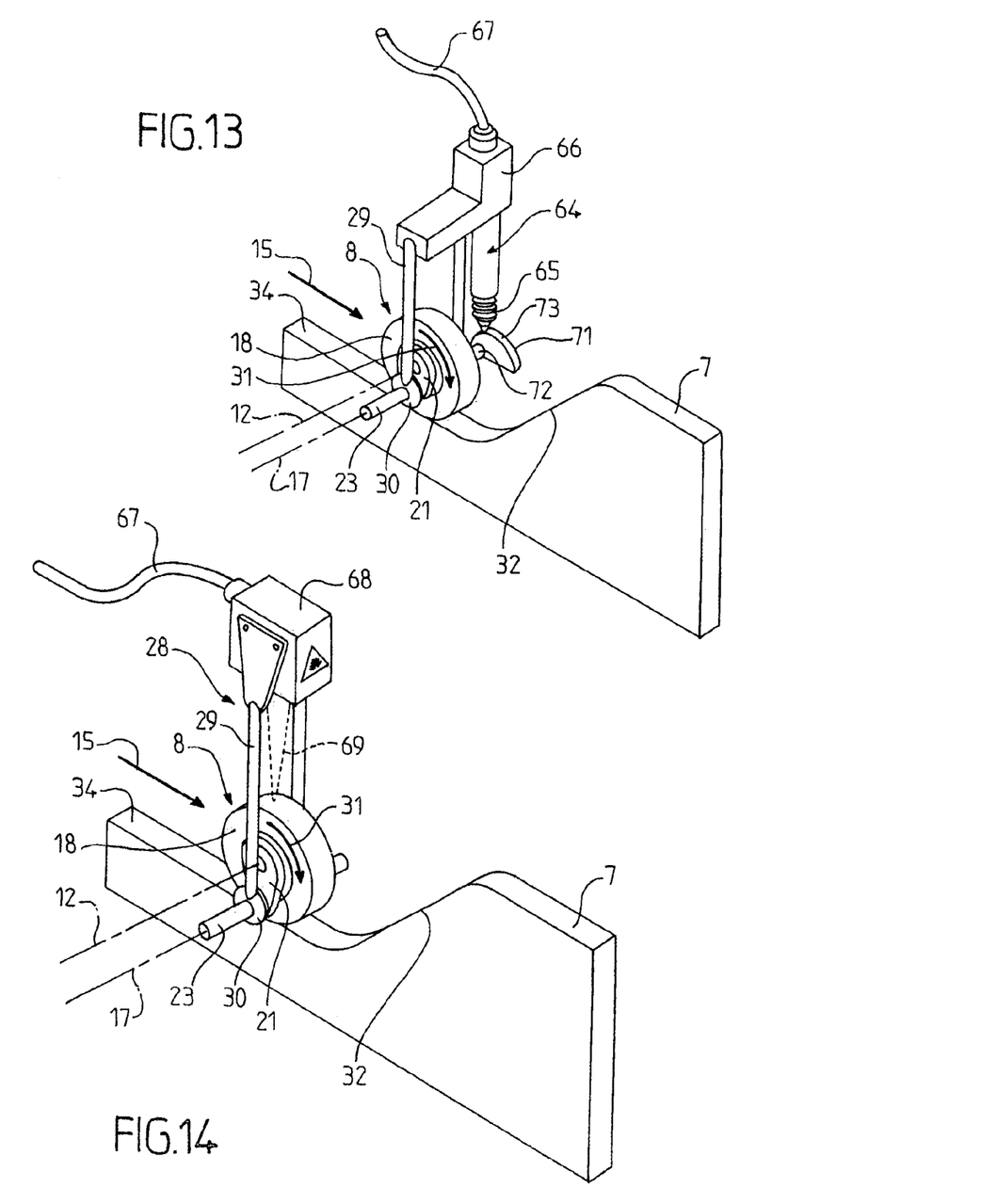

To convert the orientation of the roller 8 or of the handles 21 into an electrical measurement signal, there are possibilities other than the potentiometer 33. Referring to FIGS. 12 to 14, there now follows a description of three other embodiments of the conversion device. The elements that are identical or similar to those of FIG. 3 bear the same reference numeral as in FIG. 3 and are not described again.

In FIG. 12, a mechanical sensor 64 comprises a body 66 rigidly fixed to the top end of the support branches 29 between the latter and a moving probe 65 kept elastically in contact with the wheel 18 and capable of being translated axially, parallel to the support branches 29, relative to the body 66, in response to the changes of orientation of the wheel 18. The body 66 contains a position measurement member which converts the instantaneous position of the probe 65 into an electrical measurement signal which is sent for example in a transmission cable 67 or a wireless transmission system (not represented). Thus, the measurement signal produced by the mechanical sensor 64 represents the distance between the fixed body 66 and the intersection of the translation axis of the probe 65 with the top surface of the wheel 18. This distance is linked by a predetermined geometrical relationship to the angle of inclination of the measured surface 7, except for the sign. For the determination of the sign of the inclination, an additional device can be provided.

The embodiment of FIG. 13 is very similar. In this case, the mechanical sensor 64 is laterally offset relative to the support branches 29, by being still orientated parallel thereto. The probe 65 is in contact with a cam 71 fixed to a rod 72 securely attached to the handles 21. The top surface 73 of the cam 71 is preferably asymmetrical to as to be able to detect the sign of the inclination. In the example represented, the surface 73 is a portion of spiral imposing an axial dimension Z0 on the probe 65 when the surface is planar. An upward inclination of the measured surface 7 will be reflected in a measured dimension Z>Z0 and a downward inclination of the measured surface 7 will be reflected in a measured dimension Z<Z0, where Z is increasing toward the body 66.

The mechanical sensor 64 of FIGS. 12 and 13 can be replaced by an optical distance measurement device. A corresponding embodiment is represented in FIG. 14. In this case, an optical range finder 68 is fixed to the support branches 29 and projects a light beam 69 onto the top surface of the wheel 18. As described previously, the measurement of distance between the optical range finger 68 and the intersection of the beam 69 with the top surface of the wheel 18 makes it possible to measure the inclination of the measured surface 7, except for the sign. A similar arrangement can be provided with the cam 71 of FIG. 13.

Although, in the embodiments described above, the normal to the surface is measured using a potentiometer or a distance measurement and a work tool is orientated as a function of this measurement, the invention is not limited thereto. Thus, the roller 8 can be used only as an inclinometer or to directly orientate, rigidly, a work tool.

Figure 7:
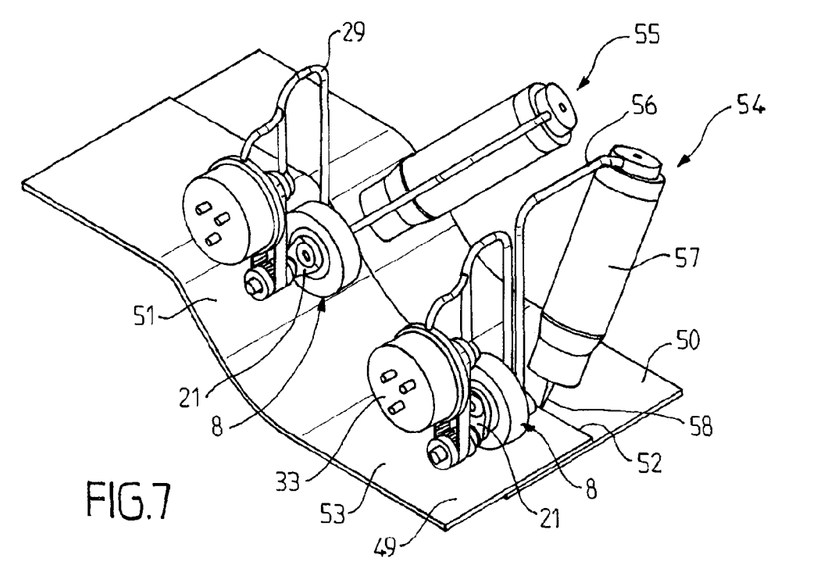
FIG. 7 is a partial perspective view of the sensor of FIG. 5 associated with a welding tool.

FIG. 7 shows such a device which is similar to FIG. 5 and in which a work tool is directly orientated by the roller 8.

The roller 8 moves on a work surface consisting of a first metal plate 49 and a second metal plate 50 of similar forms superposed on a portion of their side. The duly formed work surface therefore comprises a setback 52 between the first plate 49 and the second plate 50.

The device is represented in this figure for two positions 54 and 55. A first position 54 corresponds to the pressing of the roller 8 onto a horizontal section 53 of the work surface, and a second position 55 corresponds to the pressing of the roller 8 onto an upward section 51 of the work surface.

A welding torch 57 and its work head 56 are positioned slantwise in a plane at right angles to the direction of advance 15 to tack the setback area 52 which has to be welded. The carriage moves along the setback 52, which provokes the pivoting of the roller 8 when the normal to the surface changes direction.

Upon the rotation of the handle 21, the pivot shaft 23 drives the rotation of a tool holder 56 fixed rigidly to the pivot shaft 23. The tool holder 56 then rotationally drives the welding torch 57 rigidly fixed thereto. The tool holder 56 thus orientates the work head 58 according to the normal to the work surface at the point of contact 11. Thus, in the first position 54, the welding torch 57 is orientated substantially in the direction of the branches of the support 29, whereas, in the second position, the latter is orientated in a direction at right angles to the slope 51. In this way, the work head 56 is automatically orientated in a constant direction determined relative to the welding area that it targets.

Similarly, the work tool can be a laser marker, a machining tool, a laser cutting tool, or a jet of water.

The pressing force exerted on the roller 8 also makes it possible to correctly press the two metal plates together, and thus produce a good quality weld. Similarly, this pressing is advantageous in the context of the bonding of two superposed parts passed over by the roller 8.

The embodiments presented above illustrate devices which measure the normal of a surface in a rectilinear direction schematically represented by the direction of advance 15. However, this device can measure the normal of a surface over a non-linear trajectory. For example, FIG. 8 illustrates a guiding roller linked to the sensor 28 to guide the sensor along the trajectory of the setback 52 presented with reference to FIG. 7.

Figure 8:
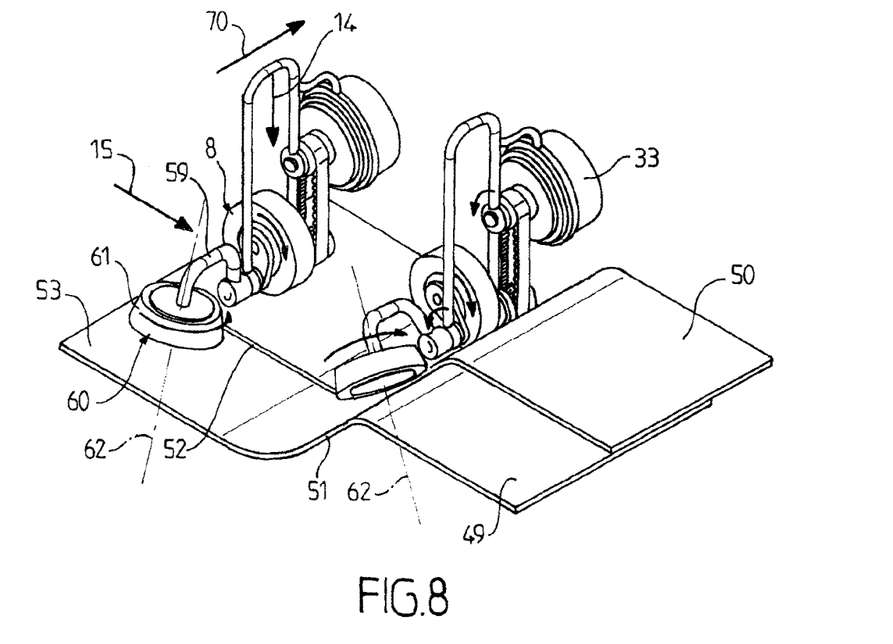
FIG. 8 is a partial perspective view of the sensor equipped with a side guiding roller.

In practice, the device illustrated in FIG. 8 is similar to the device of FIG. 7. However, instead of rigidly orientating a work tool, the roller 8 orientates a follower roller 60.

In practice, a roller support 59 is rigidly fixed to the handle 23. A follower roller 60 is mounted to pivot on the roller support 59 on an oblique axis of rotation 62 relative to the bearing direction. The follower roller 60 has a truncated tapered form, so as to have a side substantially vertical to the side of the follower roller 60 closest to the handle. In this way, only the part of the follower roller 60 closest to the setback is in proximity to the work surface.

The carriage 16 comprises means for moving laterally. During the movement of the carriage 16 in the direction of advance 15, the carriage 16 also presses the follower roller 60 in a lateral direction 70 against the vertical surface of the setback 52, as shown in FIG. 8.

In this way, the roller 8 is constantly kept at a determined distance from the setback 52.

In the same way as the variant illustrated in FIG. 7, the follower roller 60 is automatically orientated by the roller 8 on the normal to the surface.

The roller 8 in FIGS. 3 to 8 is essentially intended to measure the planar surfaces in a direction transversal to the direction of advance 15. Thus, if the normal to the surface moves outside the plane at right angles to the pivoting axis 17, the roller will not measure this declivity component. However, the invention is not limited to measuring the normal on this type of surface. In practice, according to a variant, the normal measurement device can measure the normal of a surface in three dimensions.

Figure 9:
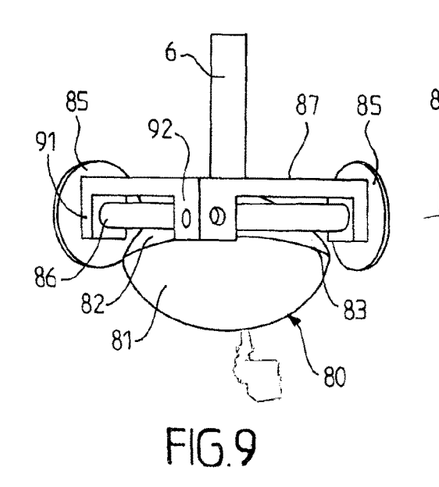
FIG. 9 is a side view of a three-dimensional sensor.
Figure 10:
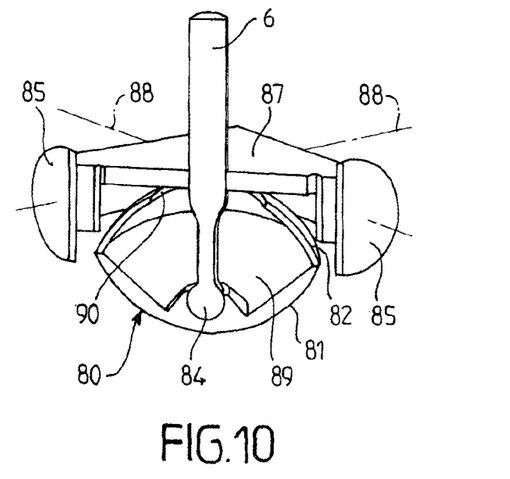
FIG. 10 is a cross-sectional view of the three-dimensional sensor of FIG. 9.

FIGS. 9 and 10 illustrate such a device.

Such a measurement device also comprises a bearing arm 6 which presses a roller 80. The roller 80 comprises a sensing surface 81 and a top surface 82. The bearing arm 6 is linked with the roller 80 by a ball joint 84 positioned inside the roller 80. To this end, the bearing arm 6 passes through the top surface 82 and an opening 90 and extends through the roller into a space 89.

The sensing surface 81 and the top surface 82 are in the form of a partial sphere which intersect and meet at an edge 83. The sensing surface 81 is off-center relative to the center of the ball joint. Thus, for the same reason as the rollers 8, when the roller 80 is pressed against a surface by the bearing arm 6, the roller 80 is automatically orientated in a direction normal to the surface at the point of contact between the sensing surface 81 and the measured surface 7, the orientation of the roller 80 corresponding to the straight line formed by the center defined by the sensing surface 81 and the center of the ball joint 84.

A square support plate 87 is rigidly linked to the bearing arm 6. Two potentiometers 85 are fixed to the rigid plate on bearings 91 and each comprise a measurement shaft 86. The two measurement shafts 86 each extend along one side of the square support plate 87 to a common bearing 92 and a common corner of the square support plate 87. The measurement shafts 86 roll on the top surface 82. In practice, since the top surface 82 is centered on the center of the ball joint 84, the measurement shafts 86 of the potentiometers 85 remain in contact with the top surface 82 when the roller 80 pivots about the ball joint 84. Thus, the measurement shafts 86 make it possible to measure, via potentiometers 85, the rotation of the roller 80 on two axes of rotation 88 at right angles. Thus, the direction of the roller 80 and therefore of the local normal, can be measured in three dimensions.

The invention is not limited to rollers comprising a cylindrical or spherical surface. In practice, the sensing surface can be any convex surface, provided that the latter has a single equilibrium contact point corresponding to the point of the sensing surface closest to the pivoting direction.

Although the invention has been described in conjunction with a number of particular embodiments, it is clear that it is in no way limited thereto and that it comprises all the technical equivalents of the means described and their combinations if the latter fall within the context of the invention.

The use of the verb "comprise" or "include" and its conjugated forms does not preclude the presence of elements or steps other than those stated in a claim. The use of the indefinite article "a" or "an" for an element or a step does not preclude, unless stipulated otherwise, the presence of a plurality of such elements or steps.

In the claims, any reference sign between parentheses should not be interpreted as a limitation on the claim.

The invention claimed is:

1. An orientation device for orientating a sensor probe relative to a local normal vector of a work surface, the device comprising:
    a frame,
    a moving support element linked to the frame and able to slide in a predetermined direction relative to the frame,
    a sensor probe able to pivot on an axis of rotation not parallel to the predetermined direction relative to a point of articulation of the support element, and
    pressure means able to move and generate a force on the moving support element in said predetermined direction so as to press the sensor probe against the work surface, wherein the sensor probe comprises a single convex external sensing surface able to be placed in contact with the work surface, the sensing surface having a single equilibrium contact point, the equilibrium contact point being a point on the sensing surface closest to the point of articulation, the point of articulation being off-center relative to the center of curvature of the sensing surface at a level of the equilibrium contact point.

2. The device as claimed in claim 1, wherein the sensing surface has a form of revolution about an axis of revolution parallel to the axis of rotation, the axis of revolution being spaced apart from the axis of rotation.

3. The device as claimed in claim 2, wherein the sensor probe comprises
    a handle comprising a first part pivotably linked to the point of articulation of the support element and defining the axis of rotation and a second part parallel to the first part and offset from the first part to define the axis of revolution, and
    a roller having the sensing surface, the roller being able to pivot relative to the second part of the handle to roll on the work surface.

4. The device as claimed in claim 1, wherein the sensor probe is able to pivot on a second axis of rotation not parallel to the predetermined direction relative to the point of articulation of the support element, the second axis of rotation being at right angles to the first axis of rotation.

5. The device as claimed in claim 4, wherein the articulation between the sensor probe and the support element is a ball joint.

6. The device as claimed in claim 4 wherein the sensing surface is substantially in the form of a spherical cap having a center spaced apart from the point of articulation.

7. The device as claimed in claim 4, wherein the device also comprises a first angle measurement element and a second angle measurement element each able to measure an angular displacement about the first and second respective axes of rotation of the sensor probe relative to a respective reference position,
    and in which the sensor probe comprises a measurement surface in the form of a second spherical cap centered on the point of articulation,
    the two angle measurement elements each comprising a measurement rod having a cylindrical surface of revolution in contact with the measurement surface, each measurement rod being able to pivot on one of the axes of rotation upon the rotation of the sensor probe.

8. The device as claimed in claim 1, wherein the predetermined direction of sliding of the moving support element is substantially at right angles to the work surface.

9. The device as claimed in claim 1, also comprising a guiding rail intended to be arranged along the work surface, the frame being mounted so as to move on the guiding rail.

10. The device as claimed in claim 9, wherein the device also comprises a follower member linked to the sensor probe, the frame comprising pressing means suitable for pressing the follower member onto a setback surface separating two parts of the work surface, the follower member being securely attached to the sensor probe so as to pivot upon the pivoting of the sensor probe and so as to keep the sensor probe at a predetermined distance from the setback surface.

11. The device as claimed in claim 10, wherein the device comprises means for moving the sensing probe in the sliding direction, a direction of advance and a pressing direction, the direction of advance and pressing direction each being at right angles to the sliding direction, the pressing means being suitable for pressing the follower member in the pressing direction and the direction of advance being at right angles to the pressing direction.

12. The device as claimed in claim 1, wherein the frame also comprises a position sensor suitable for measuring the distance between the frame and the work surface.

13. The device as claimed in claim 1, also comprising a distance sensor suitable for measuring a distance relative to the work surface, the distance sensor being arranged at a point of the device situated ahead of the point of contact between the work surface and the external sensing surface, in a direction of advance.

14. The device as claimed in claim 1, also comprising an angle measurement element suitable for measuring an angular displacement about the axis of rotation of the sensor probe relative to a reference position.

15. The device as claimed in claim 14, wherein the angle measurement element is chosen from potentiometers, incremental coders, inductive sensors, comparators and optical triangulation sensors.

16. The device as claimed in claim 14, wherein the angle measurement element comprises a shaft driven in rotation by the rotation of the sensor probe about the axis of rotation via a coupling chosen from the group comprising flexible couplings, direct couplings, gear train couplings, notched belt couplings and rocker arm system couplings.

17. The device as claimed in claim 14, wherein the angle measurement element comprises a range finder arranged in such a way as to detect the position of a top surface of the roller opposite the sensing surface in the reference frame of the moving support element.

18. The device as claimed in claim 14, wherein the angle measurement element comprises a cam linked to the sensor probe to pivot securely together with the sensor probe on the axis of rotation and a range finder arranged in such a way as to detect the position of a surface of the cam in the reference frame of the moving support element.

19. The device as claimed in claim 1, the device also comprising a work surface treatment tool capable of pivoting about the axis of rotation according to the pivoting of the sensor probe.

20. The device as claimed in claim 19, the sensor probe is only able to pivot on the axis of rotation, the sensing surface having a form of revolution about an axis of revolution parallel to the axis of rotation, the axis of revolution being spaced apart from the axis of rotation, the sensor probe comprising a handle comprising a first part pivotably linked to the point of articulation of the support element and defining the axis of rotation and a second part parallel to the first part and offset from the first part to define the axis of revolution, and in which the first part of the handle comprises a support and the treatment tool is securely linked to the support to pivot with the handle.

* * * * *